(12) United States Patent
Fix et al.

(10) Patent No.: US 9,521,630 B2
(45) Date of Patent: Dec. 13, 2016

(54) LOW POWER CHAINING

(71) Applicants: AT&T Mobility II, LLC, Atlanta, GA (US); AT&T Intellectual Property I, LP, Atlanta, GA (US)

(72) Inventors: Jeremy Fix, Acworth, GA (US); Sheldon Kent Meredith, Roswell, GA (US); Rudolph Louis Mappus, IV, Plano, TX (US)

(73) Assignees: AT&T Mobility II LLC, Atlanta, GA (US); AT&T Intellectual Property I, L.P., Atlanta, GA (US)

( * ) Notice: Subject to any disclaimer, the term of this patent is extended or adjusted under 35 U.S.C. 154(b) by 0 days.

(21) Appl. No.: 15/045,702

(22) Filed: Feb. 17, 2016

(65) Prior Publication Data

US 2016/0165553 A1 Jun. 9, 2016

Related U.S. Application Data

(63) Continuation of application No. 14/534,424, filed on Nov. 6, 2014, now Pat. No. 9,295,011.

(51) Int. Cl.
| | | |
|---|---|---|
| *H04M 11/04* | (2006.01) |
| *H04W 52/28* | (2009.01) |
| *H04W 4/00* | (2009.01) |
| *H04W 52/38* | (2009.01) |
| *H04W 4/06* | (2009.01) |
| *H04W 4/22* | (2009.01) |
| *H04W 52/36* | (2009.01) |
| *H04B 17/20* | (2015.01) |
| *H04W 8/00* | (2009.01) |
| *H04W 84/18* | (2009.01) |
| *H04B 17/23* | (2015.01) |
| *H04B 17/27* | (2015.01) |

(52) U.S. Cl.
CPC .......... *H04W 52/283* (2013.01); *H04B 17/20* (2015.01); *H04W 4/008* (2013.01); *H04W 4/06* (2013.01); *H04W 4/22* (2013.01); *H04W 8/005* (2013.01); *H04W 52/367* (2013.01); *H04W 52/383* (2013.01); *H04B 17/23* (2015.01); *H04B 17/27* (2015.01); *H04W 84/18* (2013.01)

(58) Field of Classification Search
CPC ...... H04W 4/20; H04W 84/08; H04W 74/002; H04L 67/104
USPC ....................................................... 455/404.2
See application file for complete search history.

(56) References Cited

U.S. PATENT DOCUMENTS

| | | |
|---|---|---|
| 7,263,379 B1 | 8/2007 | Parkulo et al. |
| 7,519,351 B2 | 4/2009 | Malone |
| 8,305,946 B2 | 11/2012 | Kubo |
| 8,427,979 B1 | 4/2013 | Wang |
| 8,442,482 B2 | 5/2013 | Maier et al. |
| 8,538,373 B2 | 9/2013 | Koontz et al. |
| 8,600,341 B2 | 12/2013 | Johnson |
| 8,687,630 B2 | 4/2014 | Hochendoner et al. |

(Continued)

*Primary Examiner* — Don N Vo
(74) *Attorney, Agent, or Firm* — Baker & Hostetler LLP

(57) ABSTRACT

A group of low power transceiver devices may create a private wireless network. In a private communication network, each device may monitor neighboring devices and transmit a low power signal on a periodic basis. At any time, if a device breaks away from the private communication network, the device determines its location and then transmits its location to one or more devices in the group at a high transmit power level.

20 Claims, 10 Drawing Sheets

(56) References Cited

U.S. PATENT DOCUMENTS

| | | | |
|---|---|---|---|
| 9,295,011 B1* | 3/2016 | Fix | H04W 52/283 |
| 2005/0243765 A1 | 11/2005 | Schrader et al. | |
| 2008/0134271 A1 | 6/2008 | Qin | |
| 2008/0143604 A1 | 6/2008 | Mock | |
| 2010/0091712 A1 | 4/2010 | Lu | |
| 2011/0092244 A1 | 4/2011 | Lee | |
| 2013/0176864 A1 | 7/2013 | Quan | |
| 2014/0036683 A1 | 2/2014 | Krishnamurthy et al. | |
| 2014/0073283 A1 | 3/2014 | Button et al. | |
| 2014/0199958 A1 | 7/2014 | Hassan et al. | |
| 2014/0274135 A1* | 9/2014 | Edge | H04W 4/021 455/456.2 |
| 2015/0223084 A1* | 8/2015 | Lightstone | H04W 24/08 370/252 |
| 2015/0245193 A1* | 8/2015 | Xiong | H04W 76/023 370/328 |

\* cited by examiner

LOW POWER CHAINING

CROSS-REFERENCE TO RELATED APPLICATION

This application is a continuation U.S. patent application Ser. No. 14/534,424 filed Nov. 6, 2014, which is incorporated herein by reference in its entirety.

TECHNICAL FIELD

The technical field generally relates to wireless communications and more specifically to peer-to-peer communication.

BACKGROUND

Adventure sports like mountaineering, diving, snow skiing, fast-packing, ultra-marathoning, and others involve individuals taking on risks of injury, sickness, disorientation, and ultimately getting lost from the larger group of participants. In cases such as mountaineering and diving, as examples, the existence of macro cellular networks is minimal to non-existent due to the location. Conventional technology may enable short distance communication through handheld CB radio, but these technologies require operation by the participant who often is in situations where they are unable to respond (in the case of injury, sickness, or disorientation).

SUMMARY

The following presents a simplified summary that describes some aspects example of the subject disclosure. This summary is not an extensive overview of the disclosure. Indeed, additional or alternative aspects and/or examples of the subject disclosure may be available beyond those described in the summary.

Discussed herein is the use of a group of low power transceiver devices that can create a private wireless network. A method may comprise transmitting, by a first device, a first signal at a first transmit power, the first signal indicative of a status of the first device; searching, by the first device, for a second signal of a second device, the second signal indicative of a status of the second device; determining, by the first device, that the second signal from the second device has not been detected within a first period; responsive to the determining that the second signal from the second device has not been detected within the first period, determining a location of the first device; and transmitting by the first device, at a second transmit power, an alert to the second device, the alert comprising the location.

In another example, a mobile device may comprise a processor coupled with a memory. The memory may have stored thereon executable instructions that when executed by the processor cause the processor to effectuate operations comprising: transmitting a first signal at a first transmit power, the first signal indicative of a status of the mobile device; searching for a second signal of a second device, the second signal indicative of a status of the second device; determining that the signal from the second device has not been detected within a first period; responsive to the determining that the signal from the second device has not been detected within the first period, determining a location of the mobile device; and transmitting at a second transmit power, an alert, the alert comprising the location.

In another example, there may be a system that includes a first device coupled with a second device. A memory of the first device may have stored thereon executable instructions that when executed by a processor cause the processor to effectuate operations comprising: transmitting a first signal at a first transmit power, the first signal indicative of a status of the first device; searching for a second signal of a second device, the second signal indicative of a status of the second device; determining that the signal from the second device has not been detected within a first period; responsive to the determining that the signal from the second device has not been detected within the first period, determining a location of the first device; and transmitting at a second transmit power, an alert, the alert comprising the location.

BRIEF DESCRIPTION OF THE DRAWINGS

The following detailed description is better understood when read in conjunction with the appended drawings. For the purposes of illustration, exemplary examples are shown in the drawings; however, the subject matter is not limited to the specific elements and instrumentalities disclosed. In the drawings.

DETAILED DESCRIPTION

Discussed herein is the use of a group (two or more) of low power transceiver devices that can create a private wireless network. Each device in the group may look for a signal of a neighboring device and transmit a low power signal containing a beacon on a periodic basis. In an example, the devices are paired (e.g., Bluetooth) with each other and with a master device prior to the excursion. The use of low power chaining may provide the ability to keep track of a group of devices. Each device may be associated with an individual or an object. Low power chaining may be helpful during scenarios such as school children at an offsite school field trip, elderly individuals on a shopping excursion, mountain climbing with a team, ocean diving with a team, and other scenarios where a person, animal, or object has a risk of getting lost. It is contemplated that low power chaining may be associated with anything that is desired to be kept in proximity of like or unlike objects.

Figure 1:
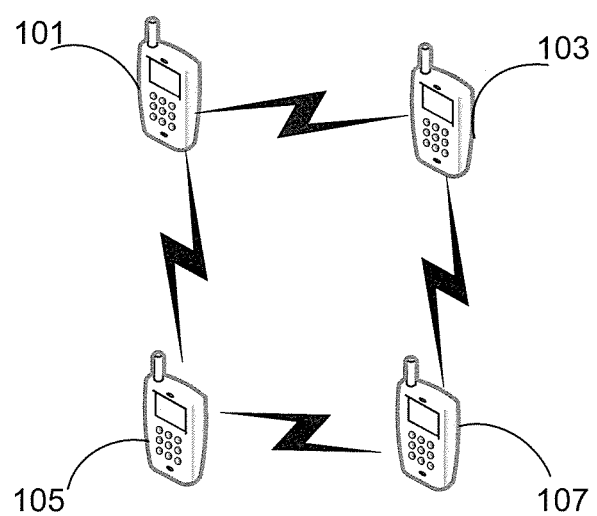
FIG. 1 illustrates an exemplary system for implementing low power chaining.

FIG. 1 illustrates an exemplary system for implementing low power chaining. In FIG. 1, wireless transmit/receive unit (WTRU) 101 is communicatively connected with WTRU 103 and WTRU 105. WTRU 107 is communicatively connected with WTRU 105 and WTRU 103. WTRU 101, WTRU 103, WTRU 105, and WTRU 107 are within group 100 and can communicate via peer-to-peer communication. The arrangement of WTRUs within group 100 is logical and is not necessarily an indication of a physical position of any one of the WTRUs. WTRU 101, WTRU 103, WTRU 105, and WTRU 107 may be any type of device configured to communicate in a wireless environment. By way of example, WTRU 101, WTRU 103, WTRU 105, or WTRU 107 may include user equipment (UE), a mobile station, a mobile device, a fixed or mobile subscriber unit, a pager, a cellular telephone, a personal digital assistant (PDA), a smartphone, a laptop, a netbook, a personal computer, a wireless sensor, a smart watch, a printer, a display, a television, a consumer electronic, or the like. A WTRU as discussed herein may be a somewhat simplistic device, such as a bracelet or band that has a small or nonexistent interface display. The simplistic WTRU may be configured for low power chaining by a more complex device such as a mobile phone, tablet, or laptop. There may be a parent-child relationship among the WTRU's in group 100. For example, WTRU 101, may be called a parent WTRU and may configure and monitor the policies for WTRU 103, WTRU 105, and WTRU 107 with regard to low power chaining. As a parent WTRU, WTRU 101 may configure policies, such as a threshold for transmitting an alert (e.g., an emergency alert), the acts that a WTRU may take after the threshold has been reached, and what WTRUs proactively listen to other WTRUs, among other things.

Figure 2:
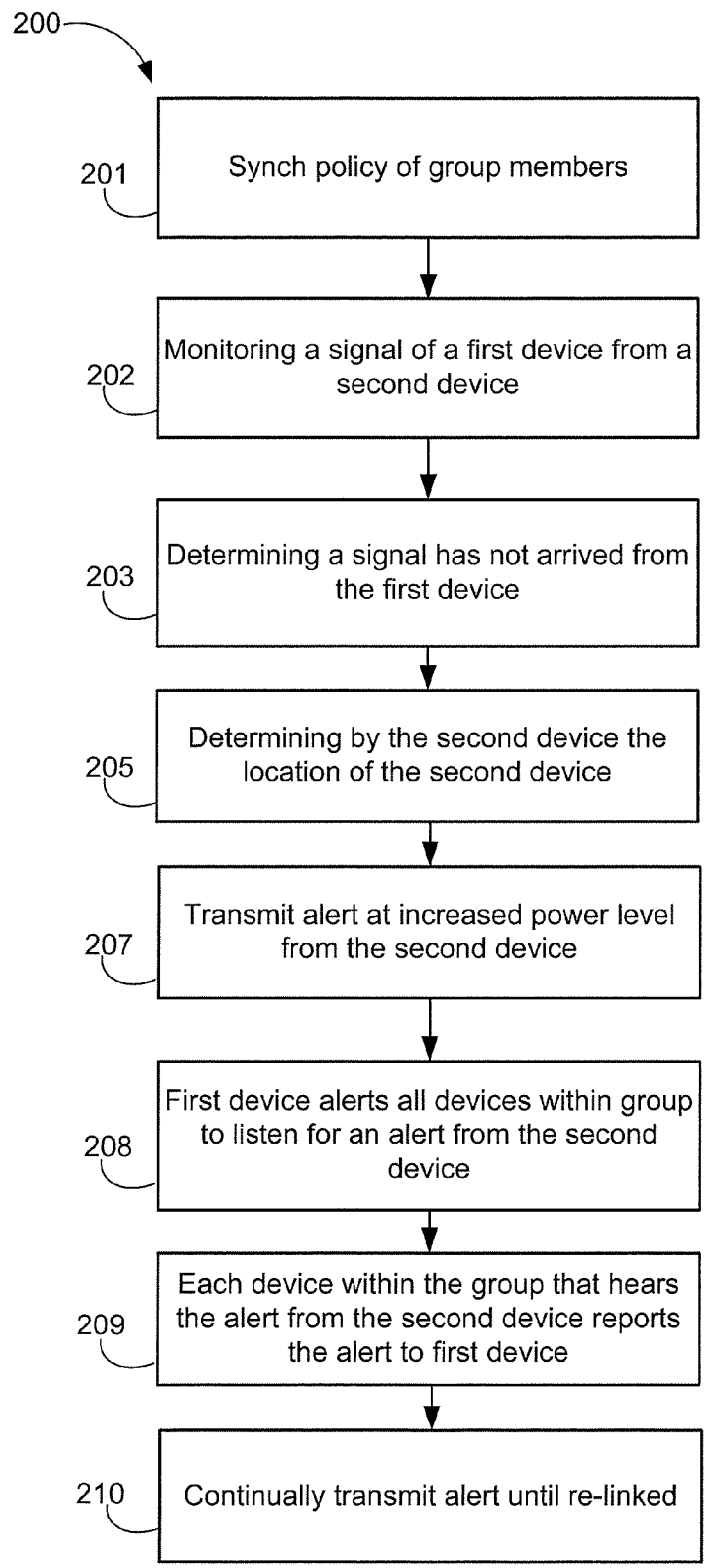
FIG. 2 illustrates an exemplary method for implementing low power chaining.

Below are exemplary methods associated with low power chaining. Unless specifically stated, the method as shown below (e.g., FIG. 2 and FIG. 5) and those in other methods presented in the drawings or described are not necessarily constrained to a particular order or sequence. FIG. 2 illustrates an exemplary method 200 for implementing low power chaining. At block 201, WTRU 103 and the other WTRUs of group 100 may have policies for low power chaining configured by WTRU 101, which in this example, is a parent WTRU. WTRU 101 may instruct WTRU 103 to set a particular transmit power level (e.g., less than 5% of max power level) and listen for and respond to different WTRUs. Each WTRU of group 100 may have a different transmit power level based on user preferences, default configurations, or the like. In an example, in a field trip scenario, there may be a desire for a WTRU associated with a child (e.g., WTRU 103) to stay close to a WTRU associated with a chaperone (e.g., WTRU 101). A WTRU associated with another chaperone (e.g., WTRU 107) may not need to be as close to the chaperone associated WTRU 101. WTRU 101 may instruct WTRU 103 to monitor an air interface for signals from WTRU 107 and WTRU 101, as well as transmit a low power wireless signal (e.g., a beacon) to WTRU 107 and WTRU 101. WTRU 101 may instruct WTRU 103 to monitor an air interface for a certain threshold period that triggers an emergency state.

At block 202, WTRU 103 monitors an air interface for a signal from another WTRU (e.g., WTRU 101). The signal may carry a beacon, which may be considered a relatively small packet with minimal information. WTRU 103 and WTRU 101 may communicate with each other at a relatively low power level that may be detectable within a few meters (e.g., 5 meters). At block 203, WTRU 103 may determine that a signal has not arrived from WTRU 101 within a threshold amount of time (e.g., 15 seconds) or at a certain time (e.g., 6 PM). WTRU 101 may have been powered off or the WTRU 103 and WTRU 101 may be out of range of each other for the relatively low power level. At block 205, WTRU 103 may determine its approximate location via an application, such as turning on and using GPS. In another example with regard to determining location, WTRU 103 may request from WTRU 107 the location of WTRU 107. WTRU 103 may then subsequently extrapolate its location based on the response from WTRU 107 (e.g., extrapolating a 5 meter radius from the received WTRU 107 location that excludes the intersection of the radius around WTRU 103).

At block 207, WTRU 103 may transmit an alert at an increased power level. WTRU 103 may transmit the alert in different ways, such as transmitting the alert to only WTRU 101, transmitting the alert to all WTRUs in its group 100 to transmit to WTRU 101, or transmitting (e.g., broadcasting) the alert to all devices in the vicinity. The alert may contain information, such as the location of WTRU 103 and the status of WTRU 103 in relation to other devices (e.g., location and communication status as associated with other devices). In an example, the alert may be sent at a substantially higher transmit power level than was previously used (e.g., greater than 50% of a previously used transmit power level). For instance with regard to the previous example, an initial transmit power may be 7 dBm and may increase 50% to approximately 10.5 dBm. In another example, the alert may be sent at or approximate maximum transmit power level of WTRU 103 (e.g., greater than or equal to 90% of the possible or recommended/regulatory transmit power level of a device). In another example, WTRU 103 may continually send an alert at a stepped up transmit power level until a particular response is received from WTRU 101. For instance, WTRU 103 may send an initial alert at a first transmit power level (e.g., 20% of max transmit power level) and then, if no response from WTRU 101, WTRU 103 may send a second alert at a second transmit power level (e.g., 30% of max power level), and so on.

At block 208, WTRU 101 (after realizing there is no signal between WTRU 101 and WTRU 103) can instruct all WTRUs in group 100 to listen for a transmission from WTRU 103. At block 209, each WTRU that hears the transmission reports back to WTRU 101. The reporting of block 209 may be through a chain of peep-to-peer connections (e.g., WTRU 107 to WTRU 105 to WTRU 101). WTRU 101 may acknowledge receipt of the reporting WTRUs using a maximum or approximately maximum transmit power. As discussed in more detail herein, at block 210, WTRU 103 may continue to transmit an alert until a satisfactory re-linking of WTRU 103 within group 100 has occurred. A satisfactory re-linking may be based on a policy configured by parent WTRU 101. An example satisfactory re-linking may be different from the previous group configuration, such as WTRU 103 linking with two WTRUs in the group, such as WTRU 107 and WTRU 105. In this satisfactory re-linking the transmit power level may be different from a previous (e.g., initially provisioned) transmit power level.

Figure 3:
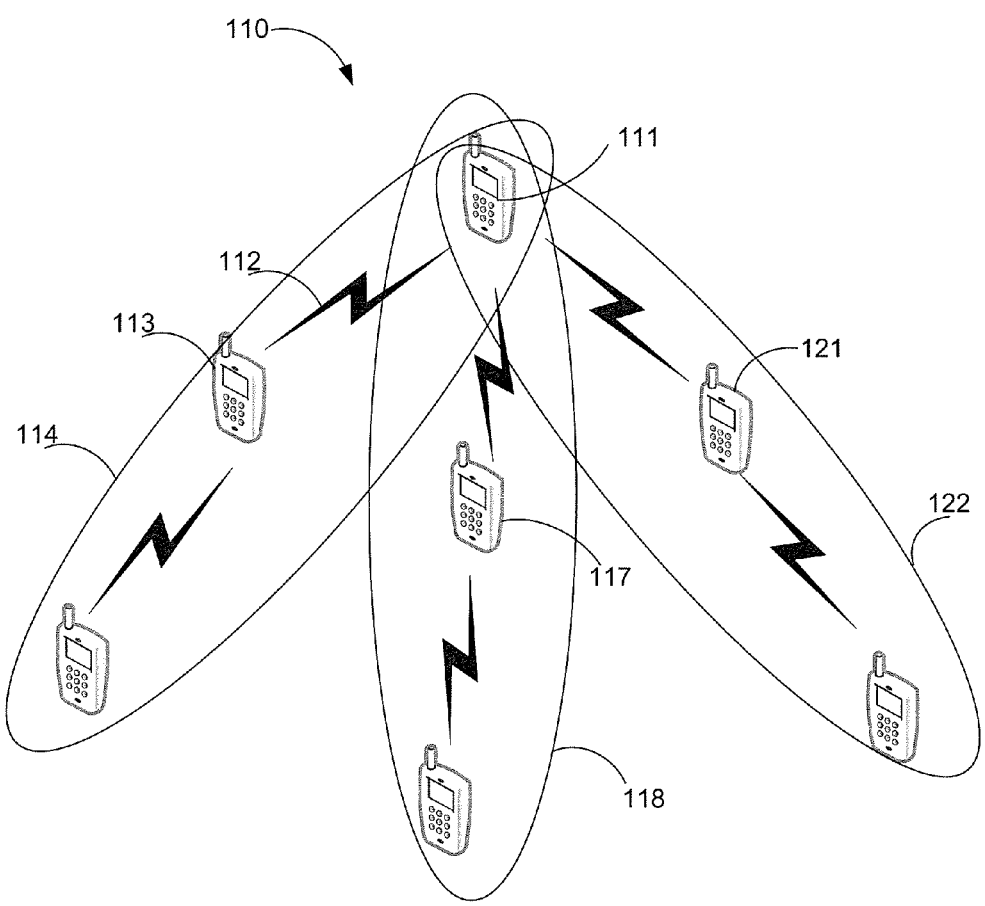
FIG. 3 illustrates an exemplary tree system for implementing low power chaining.
Figure 4:
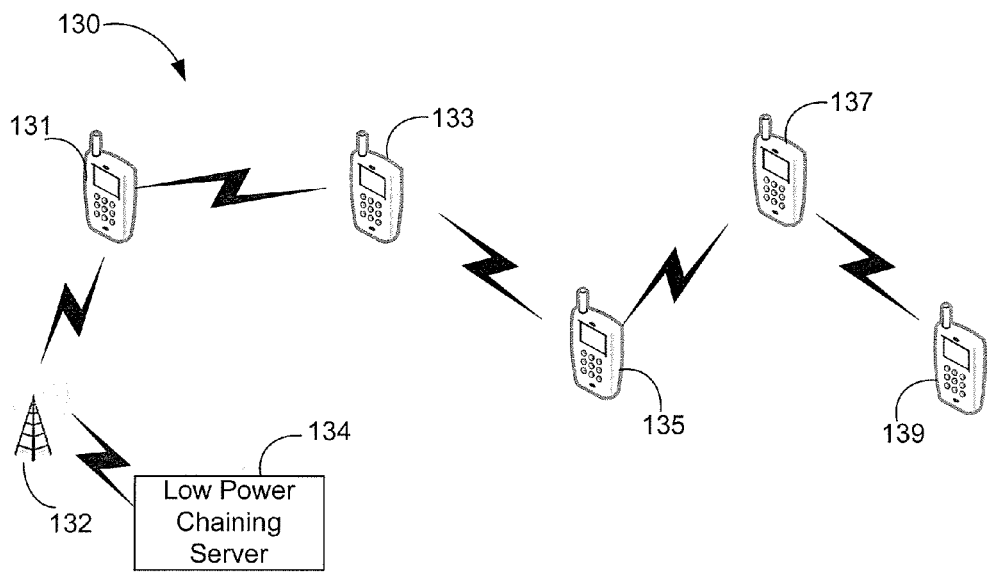
FIG. 4 illustrates an exemplary linear system for implementing low power chaining.

FIG. 3 and FIG. 4 are different logical configurations of a group of WTRUs that employs low power chaining. Some or all of the method of FIG. 2 may be implemented in the architecture as shown and described for FIG. 3 and FIG. 4. With regard to FIG. 3, WTRU 111 is a parent device and the other devices in group 110 are child WTRUs. As shown in FIG. 3, there may be different sub-groups (group 114, group 118, and group 122), which may help isolate any broadcasts when there is an emergency state. In this configuration, parent WTRU 111 only immediately monitors its links to WTRU 113, WTRU 117, and WTRU 121. If WTRU 111 is notified of an emergency state, such as link 112 being disconnected, WTRU 111 may initially address alerts to WTRUs of group 114 and group 118, until a threshold time period passes that calls for the involvement of the WTRUs of group 122.

FIG. 4 is another illustration of a configuration for low power chaining. Here, during a non-emergency state, the WTRU's in group 130 are transmitting to and listening for one or two WTRUs. WTRU 131 may maintain an active connection with cellular network 132 while the other WTRUs of group 130 only maintain a low power chaining connection (e.g., no cellular or no other wireless connection). WTRU 133, WTRU 135, WTRU 137, and WTRU 139 may periodically report the status of any peep-to-peer connections up the chain to WTRU 131. The status may be as simple as an indicator of a positive or negative status between the appropriate WTRU in group 130. WTRU 131 may periodically report the status of the group as well as its own GPS location to low power chaining server 134. The location of the other WTRUs may be extrapolated based on the GPS location of WTRU 131 and the status of the WTRUs in group 130. Low power chaining server 134 may report alerts to the appropriate authorities (e.g., United States park police (USPP)). The alerts may be an indicator of a situation that requires immediate assistance (an emergency) or an indicator that an area should be proactively patrolled. Low power chaining server 134 may also have authorization to initially provide or update policies to the WTRUs of group 130. For example, a policy may change based on the location (e.g., a challenging terrain) so that WTRUs of group 130 are instructed to be closer together or allowed to be farther apart before an alert is triggered.

Figure 5:
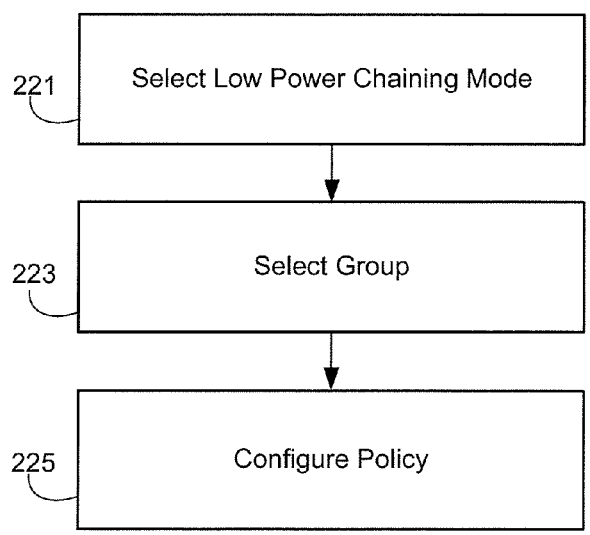
FIG. 5 illustrates an exemplary method for configuring low power chaining.

FIG. 5 illustrates an exemplary method for activating low power chaining on a WTRU. At block 221, a low power chaining mode may be selected on a WTRU. At block 223, subsequent to the low power chaining mode being selected, a group, which has other WTRUs, may be selected for the WTRU to join in low power chaining. At block 225, after the group is selected a policy that corresponds to the selected group of block 225 may be configured onto the WTRU. The policy may include turning off all wireless connections except for the wireless connection that will be used for the low power chaining. The wireless connection may be any wireless connection, such as WiFi, Bluetooth, Zigbee, or cellular.

Figure 6:
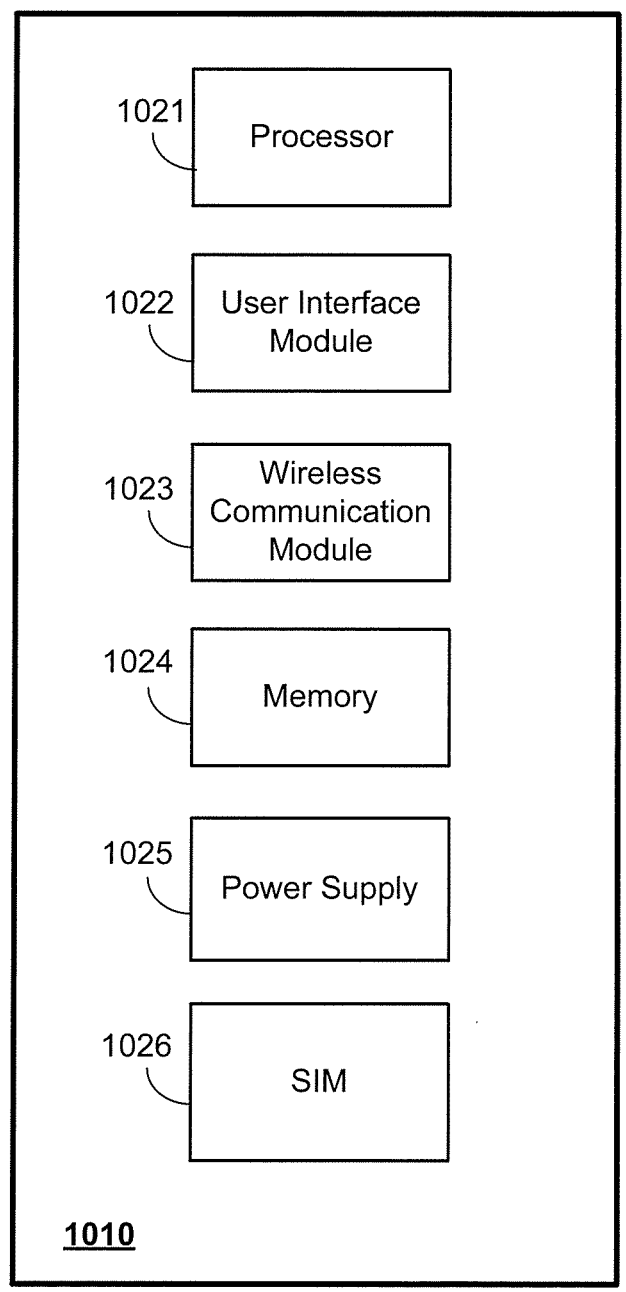
FIG. 6 is a block diagram of a non-limiting exemplary mobile device in which one or more disclosed examples may be implemented for low power chaining.

FIG. 6 illustrates an example wireless device 1010 (i.e., WTRU) that may be used in connection with an example of low power chaining. References will also be made to other figures of the present disclosure as appropriate. For example, mobile devices, such as WTRU 102, WTRU 103, and WTRU 107 may be wireless devices of the type described in regard to FIG. 6, and may have some, all, or none of the components and modules described in regard to FIG. 6. It will be appreciated that the components and modules of wireless device 1010 illustrated in FIG. 6 are illustrative, and that any number and type of components and/or modules may be present in wireless device 1010. In addition, the functions performed by any or all of the components and modules illustrated in FIG. 6 may be performed by any number of physical components. Thus, it is possible that in some examples the functionality of more than one component and/or module illustrated in FIG. 4 may be performed by any number or types of hardware or hardware and software.

Processor 1021 may comprise any appropriate circuitry that performs operations on behalf of wireless device 1010. Such circuitry may include hardware and other components that enable processor 1021 to perform any of the functions and methods described herein. Such circuitry and other components may also enable processor 1021 to communicate and/or interact with other devices and components, for example any other component of device of wireless device 1010, in such a manner as to enable processor 118 and such other devices and/or components to perform any of the disclosed functions and methods. In one example, processor 1021 executes software (i.e., computer readable instructions stored in a computer readable medium) that may include functionality related to low power chaining, for example. User interface module 1022 may be any type or combination of hardware and software that enables a user to operate and interact with wireless device 1010, and, in one example, to interact with a system enabling the user to place, request, and/or receive calls, text communications of any type, voicemail, voicemail notifications, voicemail content and/or data, and/or a system. For example, user interface module 1022 may include a display, physical and/or "soft" keys, voice recognition software, a microphone, a speaker and the like. Wireless communication module 1023 may be any type of transceiver including any combination of hardware and software that enables wireless device 1010 to communicate with wireless network equipment. Memory 1024 enables wireless device 1010 to store information, such as APNs, MNCs, MCCs, text communications content and associated data, multimedia content, software to efficiently process radio resource requests and service requests, and radio resource request processing preferences and configurations. Memory 1024 may take any form, such as internal random access memory (RAM), an SD card, a microSD card and the like. Power supply 1025 may be a battery or other type of power input (e.g., a charging cable that is connected to an electrical outlet, etc.) that is capable of powering wireless device 1010. SIM 1026 may be any type Subscriber Identity Module and may be configured on a removable or non-removable SIM card that allows wireless device 1010 to store data on SIM 1026.

Figure 7:
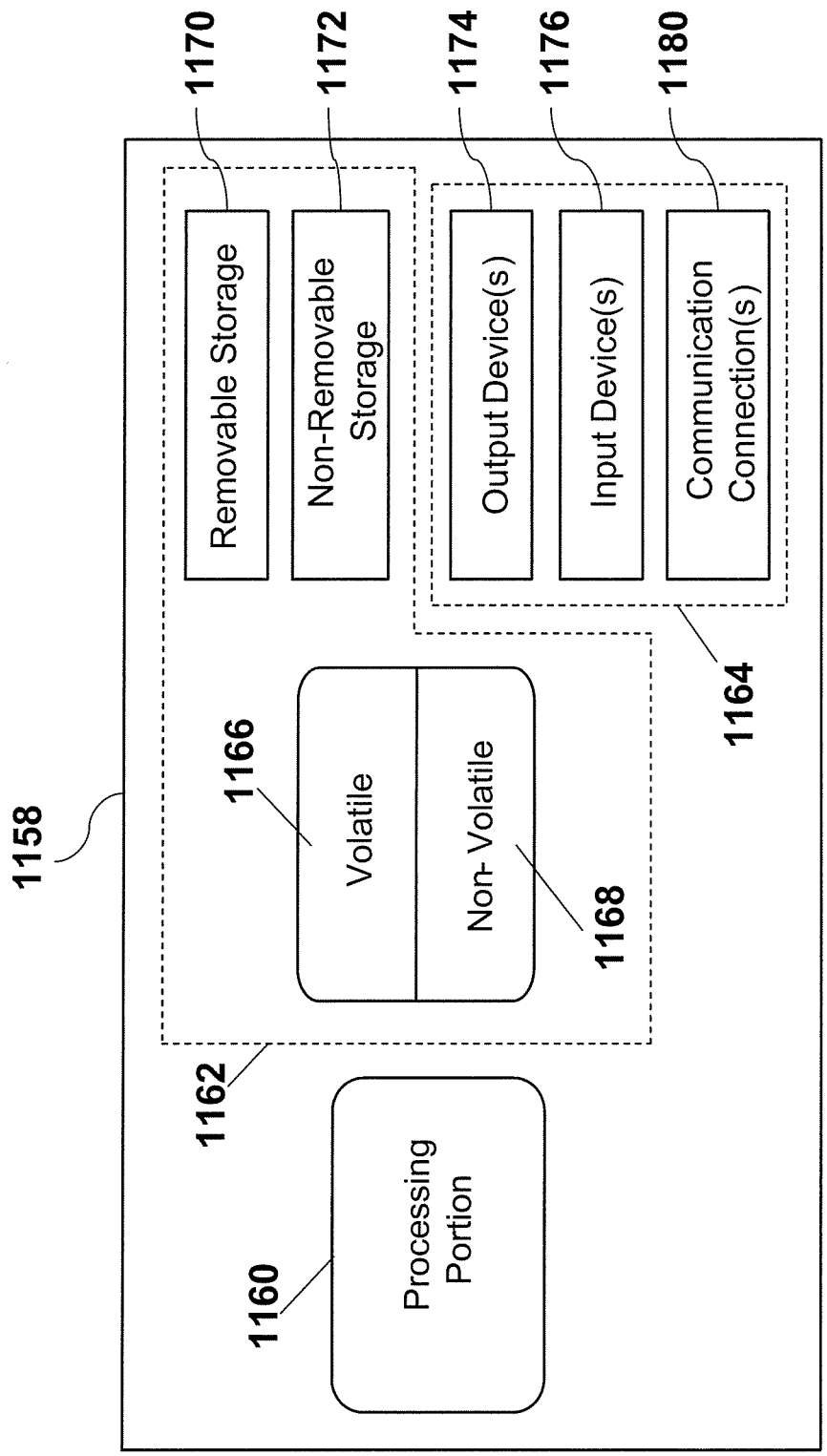
FIG. 7 is a block diagram of a non-limiting exemplary processor in which one or more disclosed examples may be implemented for low power chaining.

FIG. 7 is a block diagram of an example apparatus 1158 which may be employed in any of the examples described herein, including as one or more components of WTRU 556, WTRU 103, and WTRU 107, as one or more components of low power chaining server 134, and/or any related equipment, and/or as one or more components of any third party system or subsystem that may implement any portion of the subject matter described herein. Apparatus 1158 may be a processor. It is emphasized that the block diagram depicted in FIG. 7 is exemplary and not intended to imply a specific implementation. Thus, the apparatus 1158 may be implemented in a single processor or multiple processors. Multiple processors may be distributed or centrally located. Multiple processors can communicate wirelessly, via hard wire, or a combination thereof. Apparatus 1158 may include circuitry and other components that enable apparatus 1158 to perform any of the functions and methods described herein. Such circuitry and other components may also enable apparatus 1158 to communicate and/or interact with other devices and components, for example any other component of any device disclosed herein or any other device, in such a manner as to enable apparatus 1158 and such other devices and/or components to perform any of the disclosed functions and methods.

As depicted in FIG. 7, the apparatus 1158 may comprise a processing portion 1160, a memory portion 1162, and an input/output portion 1164. The processing portion 1160, memory portion 1162, and input/output portion 1164 are coupled together (coupling not shown in FIG. 7) to allow communications between these portions. The input/output portion 1164 is capable of providing and/or receiving components, commands, and/or instructions, utilized to, for example, request and receive APNs, MNCs, and/or MCCs, establish and terminate communications sessions, transmit and receive service requests and data access request data and responses, transmit, receive, store and process text, data, and voice communications, execute software that efficiently processes radio resource requests, receive and store service requests and radio resource requests, radio resource request processing preferences and configurations, and/or perform any other function described herein.

The apparatus 1158 may be implemented as a client processor and/or a server processor. In a basic configuration, the apparatus 1158 may include at least one processing portion 1160 and memory portion 1162. The memory portion 1162 can store any information utilized in conjunction with establishing, transmitting, receiving, and/or processing text, data, and/or voice communications, communications-related data and/or content, voice calls, other telephonic communications, etc. For example, the memory portion is capable of storing APNs, MNCs, MCCs, service requests, radio resource requests, QoS and/or APN parameters, software for low power chaining, text and data communications, calls, voicemail, multimedia content, visual voicemail applications, etc. Depending upon the exact configuration and type of processor, the memory portion 1162 can be volatile (such as RAM) 1166, non-volatile (such as ROM, flash memory, etc.) 1168, or a combination thereof. The apparatus 1158 can have additional features/functionality. For example, the apparatus 1158 may include additional storage (removable storage 1170 and/or non-removable storage 1172) including, but not limited to, magnetic or optical disks, tape, flash, smart cards or a combination thereof. Computer storage media, such as memory and storage elements 1162, 1170, 1172, 1166, and 1168, may include volatile and nonvolatile, removable and non-removable media implemented in any method or technology for storage of information such as computer readable instructions, data structures, program modules, or other data. Computer storage media include, but are not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, universal serial bus (USB) compatible memory, smart cards, or any other medium that can be used to store the desired information and that can be accessed by the apparatus 1158. Any such computer storage media may be part of the apparatus 1158.

The apparatus 1158 may also contain the communications connection(s) 1180 that allow the apparatus 1158 to communicate with other devices, for example through a radio access network (RAN). Communications connection(s) 1180 is an example of communication media. Communication media typically embody computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection as might be used with a land line telephone, and wireless media such as acoustic, RF, infrared, cellular, and other wireless media. The term computer-readable media as used herein includes both storage media and communication media. The apparatus 1158 also can have input device(s) 1176 such as keyboard, keypad, mouse, pen, voice input device, touch input device, etc. Output device(s) 1174 such as a display, speakers, printer, etc. also can be included.

A RAN as described herein may comprise any telephony radio network, or any other type of communications network, wireline or wireless, or any combination thereof. The following description sets forth some exemplary telephony radio networks, such as the global system for mobile communications (GSM), and non-limiting operating environments. The below-described operating environments should be considered non-exhaustive, however, and thus the below-described network architectures merely show how low power chaining may be implemented with stationary and non-stationary network structures and architectures in order to do low power chaining. It can be appreciated, however, that low power chaining as described herein may be incorporated with existing and/or future alternative architectures for communication networks as well.

The GSM is one of the most widely utilized wireless access systems in today's fast growing communication environment. The GSM provides circuit-switched data services to subscribers, such as mobile telephone or computer users. The General Packet Radio Service (GPRS), which is an extension to GSM technology, introduces packet switching to GSM networks. The GPRS uses a packet-based wireless communication technology to transfer high and low speed data and signaling in an efficient manner. The GPRS attempts to optimize the use of network and radio resources, thus enabling the cost effective and efficient use of GSM network resources for packet mode applications.

The exemplary GSM/GPRS environment and services described herein also may be extended to 3G services, such as Universal Mobile Telephone System (UMTS), Frequency Division Duplexing (FDD) and Time Division Duplexing (TDD), High Speed Packet Data Access (HSPDA), cdma2000 1 Evolution Data Optimized (EVDO), Code Division Multiple Access-2000 (cdma2000 3), Time Division Synchronous Code Division Multiple Access (TD-SCDMA), Wideband Code Division Multiple Access (WCDMA), Enhanced Data GSM Environment (EDGE), International Mobile Telecommunications-2000 (IMT-2000), Digital Enhanced Cordless Telecommunications (DECT), 4G Services such as Long Term Evolution (LTE), etc., as well as to other network services that become available in time. In this regard, low power chaining may be applied independently of the method of data transport and does not depend on any particular network architecture or underlying protocols.

Figure 8:
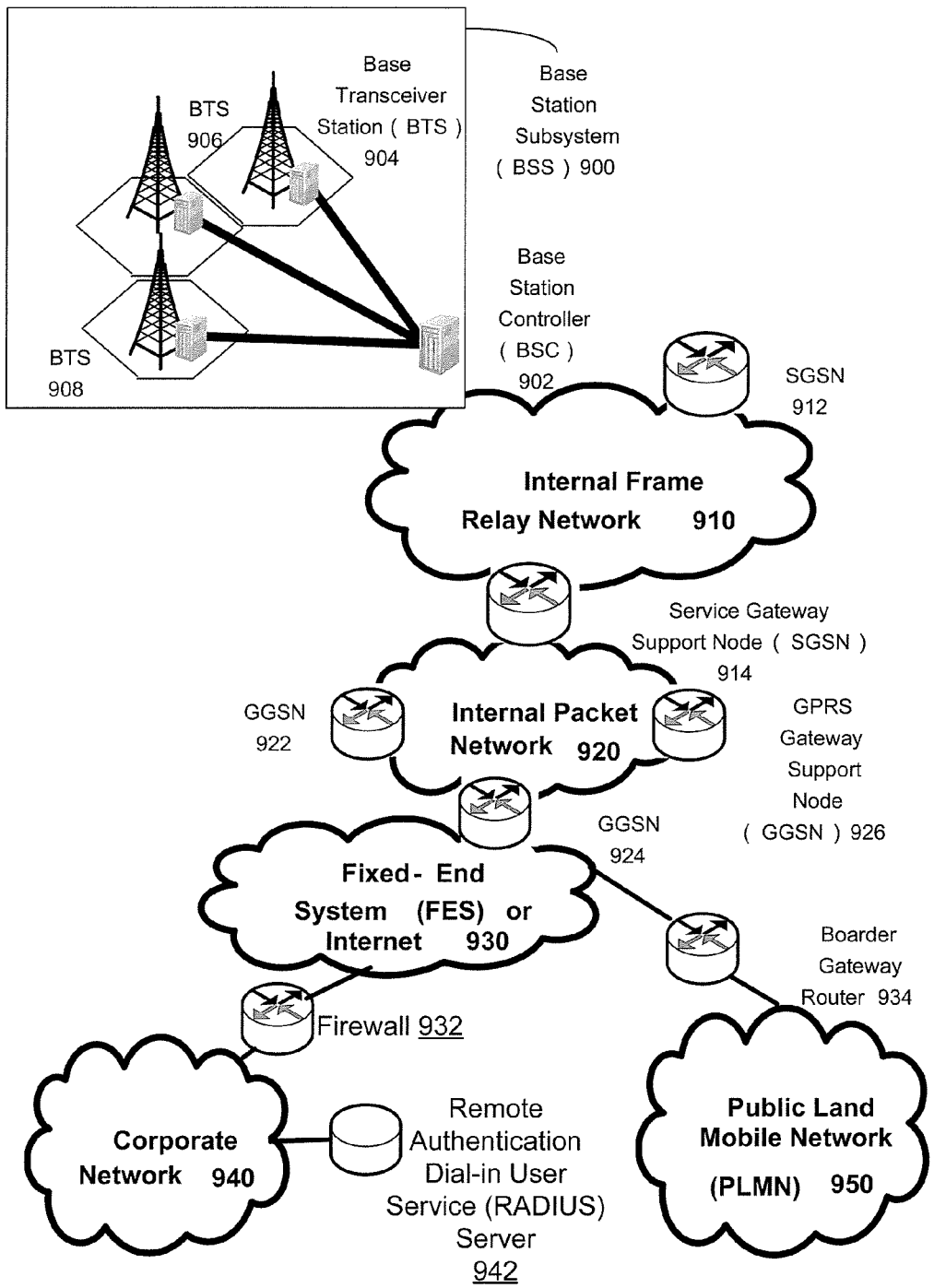
FIG. 8 is a block diagram of a non-limiting exemplary packet-based mobile cellular network environment, such as a GPRS network, in which one or more disclosed examples may be implemented for low power chaining.

FIG. 8 depicts an overall block diagram of an exemplary packet-based mobile cellular network environment, such as a GPRS network, in which low power chaining systems and methods such as those described herein may be practiced. In an example configuration, any RAN as described herein may be encompassed by or interact with the network environment depicted in FIG. 8. Similarly, mobile devices, such as WTRU 102, WTRU 103, and WTRU 107 may communicate or interact with a network environment such as that depicted in FIG. 8. In such an environment, there may be a plurality of Base Station Subsystems (BSS) 900 (only one is shown), each of which comprises a Base Station Controller (BSC) 902 serving a plurality of Base Transceiver Stations (BTS) such as BTSs 904, 906, and 908. BTSs 904, 906, 908, etc. are the access points where users of packet-based mobile devices (e.g., WTRU 102, WTRU 103, and WTRU 107) become connected to the wireless network. In exemplary fashion, the packet traffic originating from user devices (e.g., WTRU 102, WTRU 103, and WTRU 107) may be transported via an over-the-air interface to a BTS 908, and from the BTS 908 to the BSC 902. Base station subsystems, such as BSS 900, may be a part of internal frame relay network 910 that can include Service GPRS Support Nodes (SGSN) such as SGSN 912 and 914. Each SGSN may be connected to an internal packet network 920 through which a SGSN 912, 914, etc. may route data packets to and from a plurality of gateway GPRS support nodes (GGSN) 922, 924, 926, etc. As illustrated, SGSN 914 and GGSNs 922, 924, and 926 may be part of internal packet network 920. Gateway GPRS serving nodes 922, 924 and 926 may provide an interface to external Internet Protocol (IP) networks, such as Public Land Mobile Network (PLMN) 950, corporate intranets 940, or Fixed-End System (FES) or the public Internet 930. As illustrated, subscriber corporate network 940 may be connected to GGSN 924 via firewall 932, and PLMN 950 may be connected to GGSN 924 via border gateway router 934. The Remote Authentication Dial-In User Service (RADIUS) server 942 may be used for caller authentication when a user of a mobile cellular device calls corporate network 940.

Generally, there can be four different cell sizes in a GSM network, referred to as macro, micro, pico, and umbrella cells. The coverage area of each cell is different in different environments. Macro cells may be regarded as cells in which the base station antenna is installed in a mast or a building above average roof top level. Micro cells are cells whose antenna height is under average roof top level. Micro-cells may be typically used in urban areas. Pico cells are small cells having a diameter of a few dozen meters. Pico cells may be used mainly indoors. On the other hand, umbrella cells may be used to cover shadowed regions of smaller cells and fill in gaps in coverage between those cells.

Figure 9:
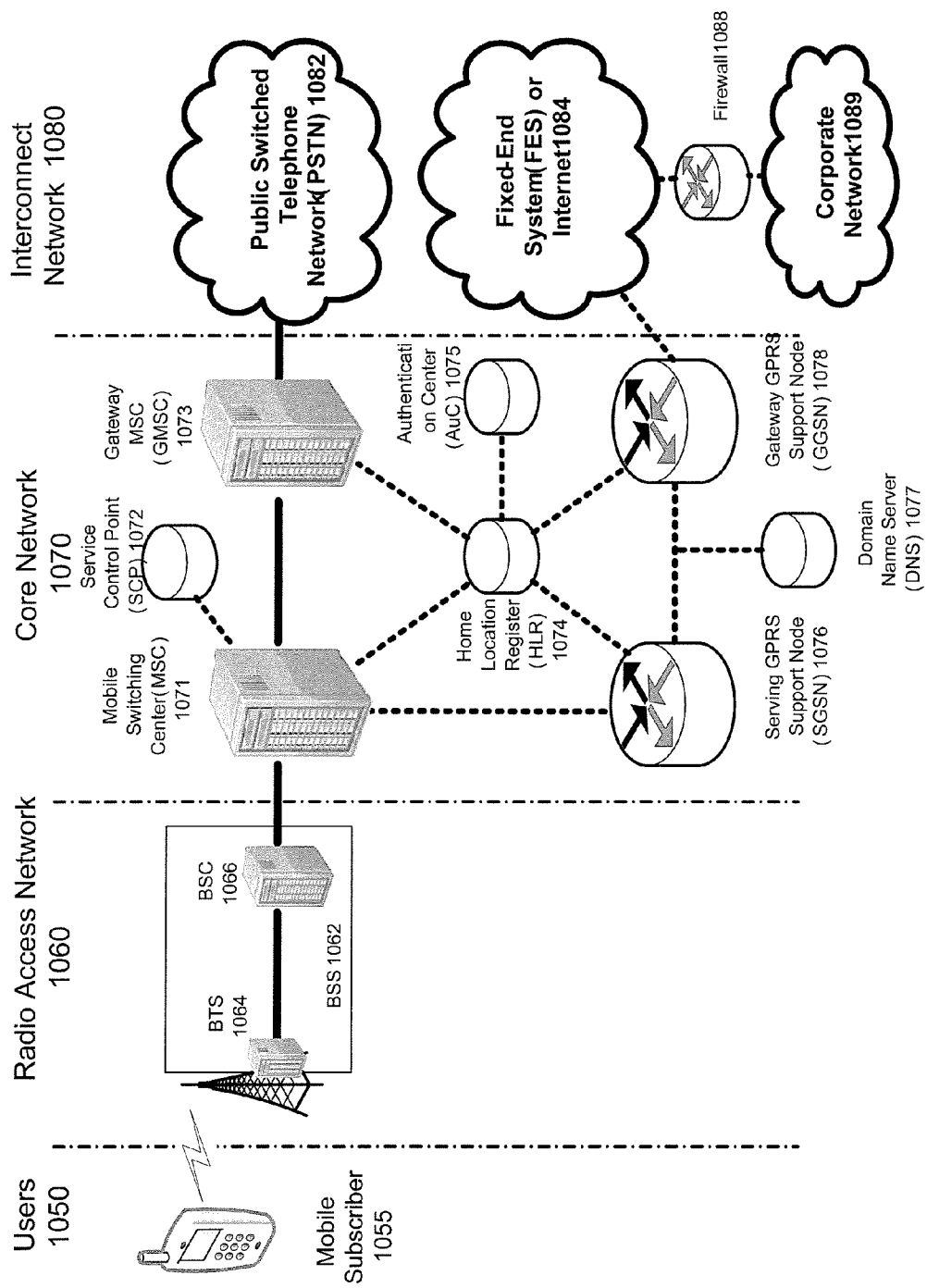
FIG. 9 illustrates a non-limiting exemplary architecture of a typical GPRS network, segmented into four groups, in which one or more disclosed examples may be implemented for low power chaining.

FIG. 9 illustrates an architecture of a typical GPRS network segmented into four groups: users 1050, radio access network 1060, core network 1070, and interconnect network 1080. Users 1050 may comprise a plurality of end users (though only mobile subscriber 1055 is shown in FIG. 9). In an example, the device depicted as mobile subscriber 1055 may comprise any of mobile devices WTRU 102, WTRU 103, and WTRU 107. Radio access network 1060 comprises a plurality of base station subsystems such as BSSs 1062, which include BTSs 1064 and BSCs 1066. Core network 1070 comprises a host of various network elements. As illustrated here, core network 1070 may comprise Mobile Switching Center (MSC) 1071, Service Control Point (SCP) 1072, gateway MSC 1073, SGSN 1076, Home Location Register (HLR) 1074, Authentication Center (AuC) 1075, Domain Name Server (DNS) 1077, and GGSN 1078. Interconnect network 1080 may also comprise a host of various networks and other network elements. As illustrated in FIG. 9, interconnect network 1080 comprises Public Switched Telephone Network (PSTN) 1082, Fixed-End System (FES) or Internet 1084, firewall 1088, and Corporate Network 1089.

A mobile switching center may be connected to a large number of base station controllers. At MSC 1071, for instance, depending on the type of traffic, the traffic may be separated in that voice may be sent to Public Switched Telephone Network (PSTN) 1082 through Gateway MSC (GMSC) 1073, and/or data may be sent to SGSN 1076 that may send the data traffic to GGSN 1078 for further forwarding.

When MSC 1071 receives call traffic, for example, from BSC 1066, it may send a query to a database hosted by SCP 1072. The SCP 1072 may process the request and may issue a response to MSC 1071 so that it may continue call processing as appropriate.

The HLR 1074 may be a centralized database for users to register to the GPRS network. In some examples, HLR 1074 may be a device such as HSSs. HLR 1074 may store static information about the subscribers such as the International Mobile Subscriber Identity (IMSI), APN profiles as described herein, subscribed services, and a key for authenticating the subscriber. HLR 1074 may also store dynamic subscriber information such as dynamic APN profiles and the current location of the mobile subscriber. HLR 1074 may also serve to intercept and determine the validity of destination numbers in messages sent from a device, such as mobile subscriber 1055, as described herein. Associated with HLR 1074 may be AuC 1075. AuC 1075 may be a database that contains the algorithms for authenticating subscribers and may include the associated keys for encryption to safeguard the user input for authentication.

In the following, depending on context, the term "mobile subscriber" sometimes refers to the end user and sometimes to the actual portable device, such as WTRU 102, WTRU 103, and WTRU 107, used by an end user of a mobile cellular service or a wireless provider. When a mobile subscriber turns on his or her mobile device, the mobile device may go through an attach process by which the mobile device attaches to an SGSN of the GPRS network. In FIG. 9, when mobile subscriber 1055 initiates the attach process by turning on the network capabilities of the mobile device, an attach request may be sent by mobile subscriber 1055 to SGSN 1076. The SGSN 1076 queries another SGSN, to which mobile subscriber 1055 was attached before, for the identity of mobile subscriber 1055. Upon receiving the identity of mobile subscriber 1055 from the other SGSN, SGSN 1076 may request more information from mobile subscriber 1055. This information may be used to authenticate mobile subscriber 1055 to SGSN 1076 by HLR 1074. Once verified, SGSN 1076 sends a location update to HLR 1074 indicating the change of location to a new SGSN, in this case SGSN 1076. HLR 1074 may notify the old SGSN, to which mobile subscriber 1055 was attached before, to cancel the location process for mobile subscriber 1055. HLR 1074 may then notify SGSN 1076 that the location update has been performed. At this time, SGSN 1076 sends an Attach Accept message to mobile subscriber 1055, which in turn sends an Attach Complete message to SGSN 1076.

After attaching itself to the network, mobile subscriber 1055 may then go through the authentication process. In the authentication process, SGSN 1076 may send the authentication information to HLR 1074, which may send information back to SGSN 1076 based on the user profile that was part of the user's initial setup. The SGSN 1076 may then send a request for authentication and ciphering to mobile subscriber 1055. The mobile subscriber 1055 may use an algorithm to send the user identification (ID) and password to SGSN 1076. The SGSN 1076 may use the same algorithm and compares the result. If a match occurs, SGSN 1076 authenticates mobile subscriber 1055.

Next, the mobile subscriber 1055 may establish a user session with the destination network, corporate network 1089, by going through a Packet Data Protocol (PDP) activation process. Briefly, in the process, mobile subscriber 1055 may request access to an Access Point Name (APN), for example, UPS.com, and SGSN 1076 may receive the activation request from mobile subscriber 1055. SGSN 1076 may then initiate a Domain Name Service (DNS) query to learn which GGSN node has access to the UPS.com APN. The DNS query may be sent to the DNS server within the core network 1070, such as DNS 1077, which may be provisioned to map to one or more GGSN nodes in the core network 1070. Based on the APN, the mapped GGSN 1078 may access the requested corporate network 1089. The SGSN 1076 may then send to GGSN 1078 a Create Packet Data Protocol (PDP) Context Request message that contains necessary information. The GGSN 1078 may send a Create PDP Context Response message to SGSN 1076, which may then send an Activate PDP Context Accept message to mobile subscriber 1055.

Once activated, data packets of the call made by mobile subscriber 1055 may then go through radio access network 1060, core network 1070, and interconnect network 1080, in a particular fixed-end system, or Internet 1084 and firewall 1088, to reach corporate network 1089.

Thus, network elements that can invoke the functionality of low power chaining systems and methods such as those described herein may include, but are not limited to, Gateway GPRS Support Node tables, Fixed End System router tables, firewall systems, VPN tunnels, and any number of other network elements as required by the particular digital network.

Figure 10:
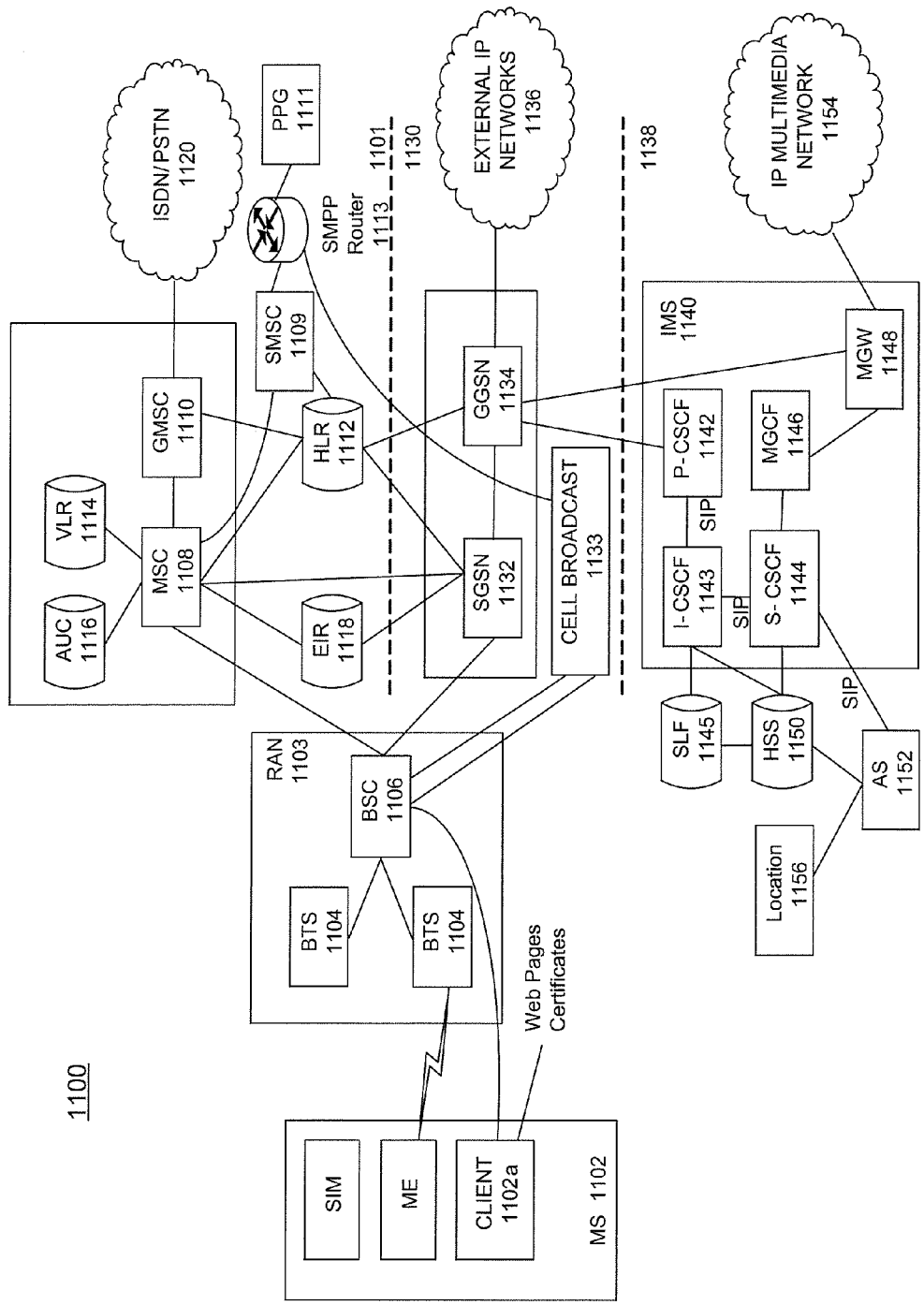
FIG. 10 illustrates a non-limiting alternate block diagram of an exemplary GSM/GPRS/IP multimedia network architecture in which one or more disclosed examples may be implemented for low power chaining.

FIG. 10 illustrates another exemplary block diagram view of a GSM/GPRS/IP multimedia network architecture 1100 in which the systems and methods for low power chaining such as those described herein may be incorporated. As illustrated, architecture 1100 of FIG. 10 includes a GSM core network 1101, a GPRS network 1130 and an IP multimedia network 1138. The GSM core network 1101 includes a Mobile Station (MS) 1102, at least one Base Transceiver Station (BTS) 1104 and a Base Station Controller (BSC) 1106. The MS 1102 is physical equipment or Mobile Equipment (ME), such as a mobile telephone or a laptop computer (e.g., WTRU 102, WTRU 103, and WTRU 107) that is used by mobile subscribers, in one example with a Subscriber identity Module (SIM). The SIM includes an International Mobile Subscriber Identity (IMSI), which is a unique identifier of a subscriber. The SIM may also include APNs. The BTS 1104 may be physical equipment, such as a radio tower, that enables a radio interface to communicate with the MS. Each BTS may serve more than one MS. The BSC 1106 may manage radio resources, including the BTS. The BSC may be connected to several BTSs. The BSC and BTS components, in combination, are generally referred to as a base station (BSS) or radio access network (RAN) 1103.

The GSM core network 1101 may also include a Mobile Switching Center (MSC) 1108, a Gateway Mobile Switching Center (GMSC) 1110, a Home Location Register (HLR) 1112, Visitor Location Register (VLR) 1114, an Authentication Center (AuC) 1118, and an Equipment Identity Register (EIR) 1116. The MSC 1108 may perform a switching function for the network. The MSC may also perform other functions, such as registration, authentication, location updating, handovers, and call routing. The GMSC 1110 may provide a gateway between the GSM network and other networks, such as an Integrated Services Digital Network (ISDN) or Public Switched Telephone Networks (PSTNs) 1120. Thus, the GMSC 1110 provides interworking functionality with external networks.

The HLR 1112 may be a database that may contain administrative information regarding each subscriber registered in a corresponding GSM network. Such information may include APNs and APN profiles. The HLR 1112 may also contain the current location of each MS. The VLR 1114 may be a database that contains selected administrative information from the HLR 1112. The VLR may contain information necessary for call control and provision of subscribed services for each MS currently located in a geographical area controlled by the VLR. The HLR 1112 and the VLR 1114, together with the MSC 1108, may provide the call routing and roaming capabilities of GSM. The AuC 1116 may provide the parameters needed for authentication and encryption functions. Such parameters allow verification of a subscriber's identity. The EIR 1118 may store security-sensitive information about the mobile equipment.

A Short Message Service Center (SMSC) 1109 allows one-to-one short message service (SMS), or multimedia message service (MMS), messages to be sent to/from the MS 1102. A Push Proxy Gateway (PPG) 1111 is used to "push" (i.e., send without a synchronous request) content to the MS 1102. The PPG 1111 acts as a proxy between wired and wireless networks to facilitate pushing of data to the MS 1102. A Short Message Peer to Peer (SMPP) protocol router 1113 may be provided to convert SMS-based SMPP messages to cell broadcast messages. SMPP is a protocol for exchanging SMS messages between SMS peer entities such as short message service centers. The SMPP protocol is often used to allow third parties, e.g., content suppliers such as news organizations, to submit bulk messages.

To gain access to GSM services, such as voice, data, short message service (SMS), and multimedia message service (MMS), the MS may first register with the network to indicate its current location by performing a location update and IMSI attach procedure. MS 1102 may send a location update including its current location information to the MSC/VLR, via BTS 1104 and BSC 1106. The location information may then be sent to the MS's HLR. The HLR may be updated with the location information received from the MSC/VLR. The location update may also be performed when the MS moves to a new location area. Typically, the location update may be periodically performed to update the database as location updating events occur.

GPRS network 1130 may be logically implemented on the GSM core network architecture by introducing two packet-switching network nodes, a serving GPRS support node (SGSN) 1132, a cell broadcast and a Gateway GPRS support node (GGSN) 1134. The SGSN 1132 may be at the same hierarchical level as the MSC 1108 in the GSM network. The SGSN may control the connection between the GPRS network and the MS 1102. The SGSN may also keep track of individual MS's locations and security functions and access controls.

Cell Broadcast Center (CBC) 1133 may communicate cell broadcast messages that are typically delivered to multiple users in a specified area. Cell Broadcast is one-to-many geographically focused service. It enables messages to be communicated to multiple mobile telephone customers who are located within a given part of its network coverage area at the time the message is broadcast.

GGSN 1134 may provide a gateway between the GPRS network and a public packet network (PDN) or other IP networks 1136. That is, the GGSN may provide interworking functionality with external networks, and set up a logical link to the MS through the SGSN. When packet-switched data leaves the GPRS network, it may be transferred to an external TCP-IP network 1136, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services may be used in parallel. The MS may operate in one three classes: class A, class B, and class C. A class A MS may attach to the network for both GPRS services and GSM services simultaneously. A class A MS may also support simultaneous operation of GPRS services and GSM services. For example, class A mobiles may receive GSM voice/data/SMS calls and GPRS data calls at the same time.

A class B MS may attach to the network for both GPRS services and GSM services simultaneously. However, a class B MS does not support simultaneous operation of the GPRS services and GSM services. That is, a class B MS can only use one of the two services at a given time.

A class C MS can attach for only one of the GPRS services and GSM services at a time. Simultaneous attachment and operation of GPRS services and GSM services is not possible with a class C MS.

GPRS network 1130 may be designed to operate in three network operation modes (NOM1, NOM2 and NOM3). A network operation mode of a GPRS network may be indicated by a parameter in system information messages transmitted within a cell. The system information messages may direct an MS where to listen for paging messages and how to signal towards the network. The network operation mode represents the capabilities of the GPRS network. In a NOM1 network, a MS may receive pages from a circuit switched domain (voice call) when engaged in a data call. The MS may suspend the data call or take both simultaneously, depending on the ability of the MS. In a NOM2 network, a MS may not receive pages from a circuit switched domain when engaged in a data call, since the MS may be receiving data and may not be listening to a paging channel. In a NOM3 network, a MS may monitor pages for a circuit switched network while receiving data and vice versa.

The IP multimedia network 1138 was introduced with 3GPP Release 5, and may include IP multimedia subsystem (IMS) 1140 to provide rich multimedia services to end users. A representative set of the network entities within IMS 1140 are a call/session control function (CSCF), a media gateway control function (MGCF) 1146, a media gateway (MGW) 1148, and a master subscriber database, called a home subscriber server (HSS) 1150. HSS 1150 may be common to GSM core network 1101, GPRS network 1130 as well as IP multimedia network 1138. HSS 1150 may include multiple HSSs.

IP multimedia system 1140 may be built around the call/session control function, of which there are three types: an interrogating CSCF (I-CSCF) 1143, a proxy CSCF (P-CSCF) 1142, and a serving CSCF (S-CSCF) 1144. The P-CSCF 1142 is the MS's first point of contact with the IMS 1140. The P-CSCF 1142 may forward session initiation protocol (SIP) messages received from the MS to an SIP server in a home network (and vice versa) of the MS. The P-CSCF 1142 may also modify an outgoing request according to a set of rules defined by the network operator (for example, address analysis and potential modification).

I-CSCF 1143 forms an entrance to a home network and hides the inner topology of the home network from other networks and provides flexibility for selecting an S-CSCF. I-CSCF 1143 may contact subscriber location function (SLF) 1145 to determine which HSS 1150 to use for the particular subscriber, if multiple HSSs 1150 are present. S-CSCF 1144 may perform the session control services for MS 1102. This includes routing originating sessions to external networks and routing terminating sessions to visited networks. S-CSCF 1144 may also decide whether an application server (AS) 1152 is required to receive information on an incoming SIP session request to ensure appropriate service handling. This decision may be based on information received from HSS 1150 (or other sources, such as application server 1152). AS 1152 may also communicate to location server 1156 (e.g., a Gateway Mobile Location Center (GMLC)) that provides a position (e.g., latitude/longitude coordinates) of MS 1102.

HSS 1150 may contain a subscriber profile and keep track of which core network node is currently handling the subscriber. It may also support subscriber authentication and authorization functions (AAA). In networks with more than one HSS 1150, a subscriber location function provides information on the HSS 1150 that contains the profile of a given subscriber.

MGCF 1146 may provide interworking functionality between SIP session control signaling from the IMS 1140 and ISUP/BICC call control signaling from the external GSTN networks (not shown.) It may also control the media gateway (MGW) 1148 that provides user-plane interworking functionality (e.g., converting between AMR- and PCM-coded voice.) MGW 1148 may also communicate with other IP multimedia networks 1154.

Push to Talk over Cellular (PoC) capable mobile telephones may register with the wireless network when the telephones are in a predefined area (e.g., job site, etc.) When the mobile telephones leave the area, they may register with the network in their new location as being outside the predefined area. This registration, however, does not indicate the actual physical location of the mobile telephones outside the pre-defined area.

Figure 11:
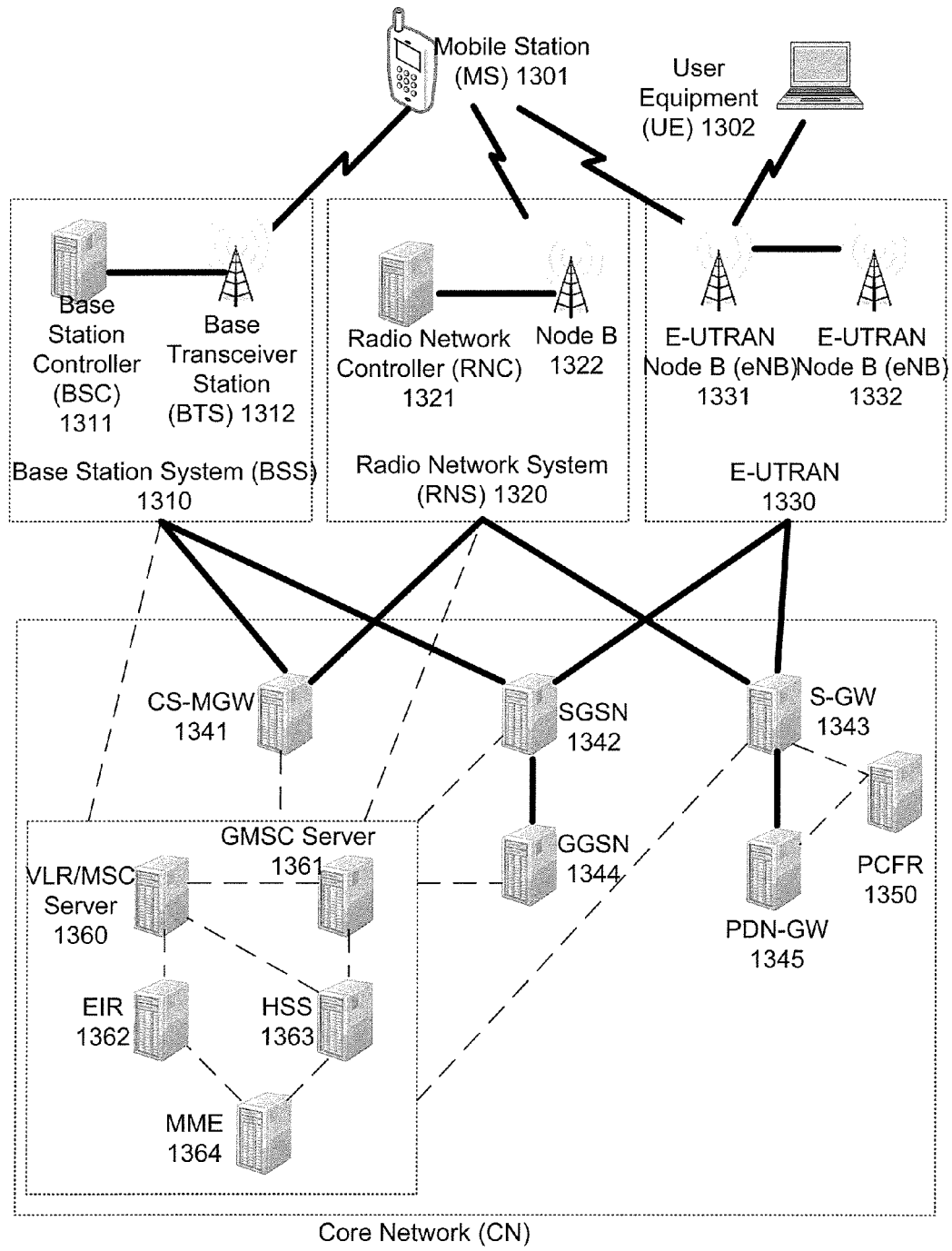
FIG. 11 illustrates a Public Land Mobile Network (PLMN) block diagram view of an exemplary architecture in which one or more disclosed examples may be implemented for low power chaining.

FIG. 11 illustrates a PLMN block diagram view of an exemplary architecture in which low power chaining may be incorporated. Mobile Station (MS) 1301 is the physical equipment used by the PLMN subscriber. In one illustrative example, communications device 40 may serve as Mobile Station 1301. Mobile Station 1301 may be one of, but not limited to, a cellular telephone, a cellular telephone in combination with another electronic device or any other wireless mobile communication device.

Mobile Station 1301 may communicate wirelessly with Base Station System (BSS) 1310. BSS 1310 contains a Base Station Controller (BSC) 1311 and a Base Transceiver Station (BTS) 1312. BSS 1310 may include a single BSC 1311/BTS 1312 pair (Base Station) or a system of BSC/BTS pairs which are part of a larger network. BSS 1310 is responsible for communicating with Mobile Station 1301 and may support one or more cells. BSS 1310 is responsible for handling cellular traffic and signaling between Mobile Station 1301 and Core Network 1340. Typically, BSS 1310 performs functions that include, but are not limited to, digital conversion of speech channels, allocation of channels to mobile devices, paging, and transmission/reception of cellular signals.

Additionally, Mobile Station 1301 may communicate wirelessly with Radio Network System (RNS) 1320. RNS 1320 contains a Radio Network Controller (RNC) 1321 and one or more Node(s) B 1322. RNS 1320 may support one or more cells. RNS 1320 may also include one or more RNC 1321/Node B 1322 pairs or alternatively a single RNC 1321 may manage multiple Nodes B 1322. RNS 1320 is responsible for communicating with Mobile Station 1301 in its geographically defined area. RNC 1321 is responsible for controlling the Node(s) B 1322 that are connected to it and is a control element in a UMTS radio access network. RNC 1321 performs functions such as, but not limited to, load control, packet scheduling, handover control, security functions, as well as controlling Mobile Station 1301's access to the Core Network (CN) 1340.

The evolved UMTS Terrestrial Radio Access Network (E-UTRAN) 1330 is a radio access network that provides wireless data communications for Mobile Station 1301 and User Equipment 1302. E-UTRAN 1330 provides higher data rates than traditional UMTS. It is part of the Long Term Evolution (LTE) upgrade for mobile networks and later releases meet the requirements of the International Mobile Telecommunications (IMT) Advanced and are commonly known as a 4G networks. E-UTRAN 1330 may include of series of logical network components such as E-UTRAN Node B (eNB) 1331 and E-UTRAN Node B (eNB) 1332. E-UTRAN 1330 may contain one or more eNBs. User Equipment 1302 may be any user device capable of connecting to E-UTRAN 1330 including, but not limited to, a personal computer, laptop, mobile device, wireless router, or other device capable of wireless connectivity to E-UTRAN 1330. he improved performance of the E-UTRAN 1330 relative to a typical UMTS network allows for increased bandwidth, spectral efficiency, and functionality including, but not limited to, voice, high-speed applications, large data transfer and IPTV, while still allowing for full mobility.

An exemplary mobile data and communication service that may be implemented in the PLMN architecture described in FIG. 11 is the Enhanced Data rates for GSM Evolution (EDGE). EDGE is an enhancement for GPRS networks that implements an improved signal modulation scheme known as 9-PSK (Phase Shift Keying). By increasing network utilization, EDGE may achieve up to three times faster data rates as compared to a typical GPRS network. EDGE may be implemented on any GSM network capable of hosting a GPRS network, making it an ideal upgrade over GPRS since it may provide increased functionality of existing network resources. Evolved EDGE networks are becoming standardized in later releases of the radio telecommunication standards, which provide for even greater efficiency and peak data rates of up to 1 Mbit/s, while still allowing implementation on existing GPRS-capable network infrastructure.

Typically Mobile Station 1301 may communicate with any or all of BSS 1310, RNS 1320, or E-UTRAN 1330. In an illustrative system, each of BSS 1310, RNS 1320, and E-UTRAN 1330 may provide Mobile Station 1301 with access to Core Network 1340. The Core Network 1340 may include of a series of devices that route data and communications between end users. Core Network 1340 may provide network service functions to users in the Circuit Switched (CS) domain, the Packet Switched (PS) domain or both. The CS domain refers to connections in which dedicated network resources are allocated at the time of connection establishment and then released when the connection is terminated. The PS domain refers to communications and data transfers that make use of autonomous groupings of bits called packets. Each packet may be routed, manipulated, processed or handled independently of all other packets in the PS domain and does not require dedicated network resources.

The Circuit Switched-Media Gateway Function (CS-MGW) 1341 is part of Core Network 1340, and interacts with Visitor Location Register (VLR) and Mobile-Services Switching Center (MSC) Server 1360 and Gateway MSC Server 1361 in order to facilitate Core Network 1340 resource control in the CS domain. Functions of CS-MGW 1341 include, but are not limited to, media conversion, bearer control, payload processing and other mobile network processing such as handover or anchoring. CS-MGW 1340 may receive connections to Mobile Station 1301 through BSS 1310, RNS 1320 or both.

Serving GPRS Support Node (SGSN) 1342 stores subscriber data regarding Mobile Station 1301 in order to facilitate network functionality. SGSN 1342 may store subscription information such as, but not limited to, the International Mobile Subscriber Identity (IMSI), temporary identities, or Packet Data Protocol (PDP) addresses. SGSN 1342 may also store location information such as, but not limited to, the Gateway GPRS Support Node (GGSN) 1344 address for each GGSN where an active PDP exists. GGSN 1344 may implement a location register function to store subscriber data it receives from SGSN 1342 such as subscription or location information.

Serving Gateway (S-GW) 1343 is an interface which provides connectivity between E-UTRAN 1330 and Core Network 1340. Functions of S-GW 1343 include, but are not limited to, packet routing, packet forwarding, transport level packet processing, event reporting to Policy and Charging Rules Function (PCRF) 1350, and mobility anchoring for inter-network mobility. PCRF 1350 uses information gathered from S-GW 1343, as well as other sources, to make applicable policy and charging decisions related to data flows, network resources and other network administration functions. Packet Data Network Gateway (PDN-GW) 1345 may provide user-to-services connectivity functionality including, but not limited to, network-wide mobility anchoring, bearer session anchoring and control, and IP address allocation for PS domain connections.

Home Subscriber Server (HSS) 1363 is a database for user information, and stores subscription data regarding Mobile Station 1301 or User Equipment 1302 for handling calls or data sessions. Networks may contain one HSS 1363 or more if additional resources are required. Exemplary data stored by HSS 1363 include, but is not limited to, user identification, numbering and addressing information, security information, or location information. HSS 1363 may also provide call or session establishment procedures in both the PS and CS domains.

The VLR/MSC Server 1360 provides user location functionality. When Mobile Station 1301 enters a new network location, it begins a registration procedure. A MSC Server for that location transfers the location information to the VLR for the area. A VLR and MSC Server may be located in the same computing environment, as is shown by VLR/MSC Server 1360, or alternatively may be located in separate computing environments. A VLR may contain, but is not limited to, user information such as the IMSI, the Temporary Mobile Station Identity (TMSI), the Local Mobile Station Identity (LMSI), the last known location of the mobile station, or the SGSN where the mobile station was previously registered. The MSC server may contain information such as, but not limited to, procedures for Mobile Station 1301 registration or procedures for handover of Mobile Station 1301 to a different section of the Core Network 1340. GMSC Server 1361 may serve as a connection to alternate GMSC Servers for other mobile stations in larger networks.

Equipment Identity Register (EIR) 1362 is a logical element which may store the International Mobile Equipment Identities (IMEI) for Mobile Station 1301. In a typical example, user equipment may be classified as either "white listed" or "black listed" depending on its status in the network. In one example, if Mobile Station 1301 is stolen and put to use by an unauthorized user, it may be registered as "black listed" in EIR 1362, preventing its use on the network. Mobility Management Entity (MME) 1364 is a control node which may track Mobile Station 1301 or User Equipment 1302 if the devices are idle. Additional functionality may include the ability of MME 1364 to contact an idle Mobile Station 1301 or User Equipment 1302 if retransmission of a previous session is required.

While examples of low power chaining have been described in connection with various communications devices and computing devices/processors, the underlying concepts can be applied to any communications or computing device, processor, or system capable of implementing the low power chaining systems and methods described. The various techniques described herein may be implemented in connection with hardware or a combination of hardware and software. Thus, low power chaining, or certain aspects or portions thereof, may take the form of program code (i.e., instructions) embodied in tangible and/or media for persistent storage (i.e., non-transitory media), such as floppy diskettes, CD-ROMs, hard drives, or any other machine-readable storage medium, wherein, when the program code is loaded into and executed by a machine, such as a computer, the machine becomes an apparatus for low power chaining. A computer-readable storage medium, as described herein is an article of manufacture having a concrete, tangible, physical structure, and thus, not to be construed as a propagating signal. Any computer-readable storage medium described herein is not to be construed as a signal. Any computer-readable storage medium described herein is to be construed as an article of manufacture having a concrete, tangible, physical structure. In the case of program code execution on programmable computers, the computing device will generally include a processor, a storage medium readable by the processor (including volatile and non-volatile memory and/or storage elements), at least one input device, and at least one output device. The program(s) can be implemented in assembly or machine language, if desired. The language can be a compiled or interpreted language, and combined with hardware implementations. The components described herein are not software per se. The components described herein are not software per se. A device may comprise a processor and memory, and the memory may include executable instructions that when executed by the processor cause the device to effectuate operations, as described herein, to implement low power chaining.

Low power chaining also may be practiced via communications embodied in the form of program code that is transmitted over some transmission medium, such as over electrical wiring or cabling, through fiber optics, or via any other form of transmission, wherein, when the program code is received, loaded into, and executed by a machine, such as an EPROM, a gate array, a programmable logic device (PLD), a client computer, or the like, the machine becomes an apparatus for low power chaining. When implemented on a general-purpose processor, the program code combines with the processor to provide a unique apparatus that operates to invoke the functionality of low power chaining as described herein. Additionally, any storage techniques used in connection with a low power chaining system may invariably be a combination of hardware and software.

While low power chaining has been described in connection with the various examples of the various figures, it is to be understood that other similar examples may be used or modifications and additions may be made to the described examples for performing the same function of low power chaining without deviating therefrom. For example, one skilled in the art will recognize low power chaining as described in the present application may apply to any environment, whether wired or wireless, and may be applied to any number of such devices connected via a communications network and interacting across the network. Therefore, low power chaining should not be limited to any single example, but rather should be construed in breadth and scope in accordance with the appended claims.

What is claimed:

1. A computer readable storage medium comprising computer executable instructions that when executed by a computing device cause said computing device to effectuate operations comprising:
   searching, by a first device, for a signal, the signal indicative of a status of a second device;
   determining that the signal has not been detected within a first period; and
   responsive to the determining that the signal has not been detected within the first period,
      determining a location of the first device, and
      transmitting, at a first transmit power, an alert comprising the location to the second device, the first transmit power greater than a second transmit power of the first period.

2. The computer readable storage medium of claim 1, wherein the first transmit power is approximately a maximum transmit power of the first device.

3. The computer readable storage medium of claim 1, wherein the first transmit power is substantially higher than the second transmit power.

4. The computer readable storage medium of claim 1, wherein determining of the location of the first device is based on a global positioning system of the first device, the global positioning system of the first device is activated responsive to the determining that the signal from the second device has not been detected within the first period, wherein the global positing system is not active during the first period.

5. The computer readable storage medium of claim 1, the operations further comprising:
   detecting, by the first device, the signal from the second device; and
   deactivating a global position system on the first device responsive to the detecting the signal from the second device.

6. The computer readable storage medium of claim 1, wherein the determining of the location of the first device is based on a global positioning system of a third device.

7. The computer readable storage medium of claim 1, the operations further comprising:
   broadcasting the alert to a plurality of devices, the plurality of devices comprising the second device.

8. A mobile device comprising:
   a processor; and
   a memory coupled with the processor, the memory having stored thereon executable instructions that when executed by the processor cause the processor to effectuate operations comprising:
searching for a signal, the signal indicative of a status of a first device;
determining that the signal has not been detected within a first period; and
responsive to the determining that the signal from the first device has not been detected within the first period,
determining a location of the mobile device, and
transmitting, at a first transmit power, an alert comprising the location to the first device, the first transmit power greater than a second transmit power of the first period.

9. The mobile device of claim 8, wherein the second transmit power is approximately a maximum transmit power of the mobile device.

10. The mobile device of claim 8, wherein the second transmit power is substantially higher than the first transmit power.

11. The mobile device of claim 8, wherein determining of the location of the mobile device is based on a global positioning system of the mobile device, the global positioning system of the mobile device is activated responsive to the determining that the signal from the first device has not been detected within the first period.

12. The mobile device of claim 8, wherein the operations further comprise:
detecting the signal from the first device; and
deactivating a global position system on the mobile device based on the signal from the first device.

13. The mobile device of claim 8, wherein the determining of the location of the mobile device is based on a global positioning system of a third device.

14. The mobile device of claim 8, wherein the operations further comprise:
broadcasting the alert to a plurality of devices, the plurality of devices comprising the first device.

15. A method comprising:
searching, by a first device, for a signal, the signal indicative of a status of a second device;
determining, by the first device, that the signal has not been detected within a first period; and
responsive to the determining that the signal has not been detected within the first period,
determining, by the first device, a location of the first device, and
transmitting, at a first transmit power by the first device, an alert comprising the location to the second device, the first transmit power greater than a second transmit power of the first period.

16. The method of claim 15, wherein the first transmit power is approximately a maximum transmit power of the first device.

17. The method of claim 15, wherein the first transmit power is substantially higher than the second transmit power.

18. The method of claim 15, wherein determining of the location of the first device is based on a global positioning system of the first device, the global positioning system of the first device is activated responsive to the determining that the signal from the second device has not been detected within the first period, wherein the global positing system is not active during the first period.

19. The method of claim 15, further comprising:
detecting, by the first device, the signal from the second device; and
deactivating a global position system on the first device responsive to the detecting the signal from the second device.

20. The method of claim 15, further comprising:
broadcasting the alert to a plurality of devices, the plurality of devices comprising the second device.

* * * * *